(12) United States Patent
Davies et al.

(10) Patent No.: US 10,293,845 B2
(45) Date of Patent: May 21, 2019

(54) CLAMP ASSEMBLY FOR A STEERING COLUMN ASSEMBLY

(71) Applicant: TRW Limited, Solihull West Midlands (GB)

(72) Inventors: Niclas Davies, West Midlands (GB); Tomasz Karp, Zabrze (PL); Stephen Butler, Staffordshire (GB); Govindarajan Bangaru, Cuddalore (IN); James O'Connell, West Midlands (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 14/759,533

(22) PCT Filed: Jan. 7, 2014

(86) PCT No.: PCT/GB2014/050038
§ 371 (c)(1),
(2) Date: Jul. 7, 2015

(87) PCT Pub. No.: WO2014/108676
PCT Pub. Date: Jul. 17, 2014

(65) Prior Publication Data
US 2015/0353122 A1    Dec. 10, 2015

(30) Foreign Application Priority Data

Jan. 8, 2013   (GB) .................................. 1300262.1

(51) Int. Cl.
*B62D 1/184*   (2006.01)
*F16B 2/06*    (2006.01)

(52) U.S. Cl.
CPC ................ *B62D 1/184* (2013.01); *F16B 2/06* (2013.01); *Y10T 24/44744* (2015.01)

(58) Field of Classification Search
CPC .......... B62D 1/184; B62D 1/187; F16B 2/06; Y10T 24/44744
See application file for complete search history.

(56) References Cited

U.S. PATENT DOCUMENTS

| 4,507,982 A | * | 4/1985 | Turner | B62D 1/184 280/775 |
| 4,732,050 A | * | 3/1988 | Vollmer | B62D 1/184 280/775 |

(Continued)

FOREIGN PATENT DOCUMENTS

| EP | 1464560 A2 | 10/2004 |
| EP | 1894811 A1 | 3/2008 |

(Continued)

OTHER PUBLICATIONS

PCT International Search Report and Written Opinion, Application No. PCT/GB2014/050038, filed May 15, 2014.

(Continued)

*Primary Examiner* — Barry Gooden, Jr.
(74) *Attorney, Agent, or Firm* — MacMillan, Sobanski & Todd, LLC (57) ABSTRACT

A clamp assembly for securing a steering column shroud, comprising: a clamp pin which passes through an opening in the shroud and having a stopper towards one end, a toothed block carried by the clamp pin having a set of rake teeth, the teeth of the block being urged into engagement with a rack of teeth fixed to a support bracket by the stopper when the clamp assembly is in the clamped condition, thereby securing the relative positions of the fixed and moving portions of the steering assembly; and a biasing means that provides a biasing force that acts in an unclamped condition to bias the stopper of the clamp pin away from the moving part to permit the rack of teeth on the block to move clear of the rack of the support bracket, in which a substantial part of the biasing force provided by the biasing means acts upon the clamp pin without passing through the toothed block.

13 Claims, 6 Drawing Sheets

(56) References Cited

U.S. PATENT DOCUMENTS

| | | | | |
|---|---|---|---|---|
| 5,088,767 | A | * | 2/1992 | Hoblingre ................. F16B 2/16 280/775 |
| 5,338,064 | A | * | 8/1994 | Sadakata ................ B62D 1/184 280/775 |
| 5,743,150 | A | | 4/1998 | Fevre et al. |
| 5,787,759 | A | | 8/1998 | Olgren |
| 6,092,957 | A | * | 7/2000 | Fevre ..................... B62D 1/184 280/775 |
| 2004/0261565 | A1 | * | 12/2004 | Uphaus ................. B62D 1/184 74/493 |
| 2005/0016315 | A1 | * | 1/2005 | Breuss .................. B62D 1/184 74/493 |
| 2007/0204714 | A1 | | 9/2007 | Lutz |
| 2008/0178702 | A1 | * | 7/2008 | Lutz ..................... B62D 1/184 74/493 |

FOREIGN PATENT DOCUMENTS

| | | | |
|---|---|---|---|
| EP | 2100795 | A2 | 9/2009 |
| FR | 2952015 | A1 | 5/2011 |
| GB | 2352286 | A | 1/2001 |
| JP | 2008105610 | A | 5/2008 |

OTHER PUBLICATIONS

Patents Act 1977: Search Report under Section 17(5), Application No. GB1300262.1, filed Apr. 25, 2013.

* cited by examiner

CLAMP ASSEMBLY FOR A STEERING COLUMN ASSEMBLY

CROSS-REFERENCE TO RELATED APPLICATIONS

This application is a national stage of International Application No. PCT/GB2014/050038 filed Jan. 7, 2014, the disclosures of which are incorporated herein by reference in entirety, and which claimed priority to Great Britain Patent Application No. 1300262.1 filed Jan. 8, 2013, the disclosures of which are incorporated herein by reference in entirety.

BACKGROUND OF THE INVENTION

This invention relates to improvements in clamp assemblies for steering column assemblies, especially but not exclusively to electric power assisted steering assemblies. In particular it relates to clamp assemblies for steering column assemblies adjusted for both rake and reach.

It is known to provide a steering column assembly in which a steering wheel is connected to one or more road wheels through a collapsible or telescopic steering column shaft. The shaft is designed to collapse away from a driver of the vehicle if a load is applied to the steering wheel in the event of an accident. The shaft may comprise a single part shaft, which has a weakened central section that will concertina under an axial load. Alternatively it may comprise a two part telescopic shaft in which one part slides axially into the other under an axial load.

To locate the steering shaft relative to the vehicle it is typically supported within one or more bearings carried by an adjustable support portion, often referred to as a steering column shroud. The shroud is in turn secured to a fixed portion bolted or otherwise fixed to a conveniently accessible part of the vehicle chassis or bulkhead.

In many vehicles produced today the column shroud, which may for convenience be thought of as a non-adjustable portion and an adjustable portion, is releasably locked to the fixed portion of the vehicle in a way that permits the steering shaft to be adjusted for rake (up and down) and reach (in and out). In some applications it may be adjustable only for rake, or only for reach. Where it is adjustable for reach and rake the shroud typically comprises an inner and outer tube which telescope relative to each other, one of the tubes being fixed and the other moving to allow for the required adjustment.

A lever—which must be located within easy reach of the driver—allows a clamping mechanism to be locked and unlocked for the position of the steering column shroud to be adjusted. This enables the driver of the vehicle to set the steering wheel at the most comfortable position.

With the introduction of steering wheel mounted airbags there has recently been a demand that, once adjusted, the column must be held in place by a positive locking method. By this we mean that, when the clamp mechanism is moved into its locked position, there must be greater restraint against subsequent column movement for reach than would be created solely by friction.

It is normal to increase the resistance to movement when clamped by providing for a toothed engagement between a rack of teeth on the fixed portion of the vehicle and a toothed block of the clamp assembly. The engagement between the teeth provides a positive locking of the shroud position. When unclamped the two racks of teeth are allowed to move apart so they can move relative to each other to permit rake adjustment.

Similarly it is known to provide a toothed engagement between a further toothed block on the clamp assembly and a corresponding rack of teeth on the adjustable portion of the shroud. When the clamp assembly is in the unclamped condition the two racks of teeth are allowed to move apart so they can move relative to one another. This permits adjustment for reach.

A basic problem with the use of teeth in this way is that on occasions the tips of the teeth on one rack may be exactly in line with the tips of the teeth of the other rack that should engage them when the driver attempts to move the clamp to the clamped condition. This so called tooth-on-tooth problem can either prevent the driver locking the clamp properly or in extreme cases damage the teeth or the locking mechanism. To resolve this it is known to allow one or more of the toothed blocks to be able to slide otherwise move by a small amount, perhaps up to one half of the tooth pitch of the racks, during clamping to permit the teeth of the racks to align correctly before reaching the clamped condition.

To move the teeth apart when moving to the unclamped condition it is known to provide the teeth of the clamp assembly on toothed blocks which are threaded onto a clamp pin of the clamp assembly, and to use a biasing means such as a coil spring that acts via a spacer freely mounted on the pin directly upon the toothed block. When clamped this biasing force is overcome by a clamp mechanism to urge the toothed block onto the corresponding toothed rack. When unclamped the biasing means urges the toothed block and the clamp pin away from the racks of teeth.

The applicant has found that the use of a high force of the biasing means acting on the toothed block can impair the free side to side movement of the block when clamped, leading to increased locking forces in instances where teeth are coincident.

BRIEF SUMMARY OF THE INVENTION

According to a first aspect the invention provides a clamp assembly for securing a fixed portion of a vehicle, especially a support bracket, to a movable portion of a steering column, especially a steering column shroud, the clamp assembly comprising:

a clamp pin which passes through an opening in the fixed portion and an opening in the moving portion, the clamp pin having a stopper located towards one end;

a toothed block carried by the clamp pin having a set of rake teeth, the teeth of the block being urged into engagement with a rack of teeth fixed to the support arm by the stopper when the clamp assembly is in the clamped condition, thereby securing the relative positions of the fixed and moving portions of the steering assembly;

and a biasing means that provides a biasing force that acts in an unclamped condition of the clamp assembly to bias the stopper of the clamp pin away from the moving part to permit the rack of teeth on the block to move clear of the rack of the support bracket, thereby permitting relative movement of the fixed and moving portion of the steering assembly;

characterised in that a substantial part of the biasing force provided by the biasing means acts upon the clamp pin without passing through the toothed block.

By bypassing the toothed block the biasing force does not present a risk that the desirable free movement of the toothed block that helps reduce the risk of a tooth on tooth situation is restrained.

In one arrangement none of the biasing force provided by the biasing means passes through the toothed block, the biasing means only acting upon the clamp pin.

A clearance may be provided between the biasing means and the toothed block when the clamp assembly is in the unclamped condition. This permits a small amount of free movement of the toothed block either the axis of the pin or orthoganol to the pin (or both). This again helps reduce a tooth on tooth situation arising. By bypassing the toothed block we mean that the spring force does not impede this free movement of the block relative to the pin as it otherwise would if the force was to press the block against the clamp pin or any other part secured to the pin.

The biasing means may comprise a spring and a spacer, the spring applying a biasing force to the spacer which in turn acts directly on a part of the clamp pin. The spring and spacer may both be threaded onto the clamp pin. The spring may be located in the space between the arms of the support bracket.

The spacer may pass through a slot in the support bracket to engage the spring. It may comprise an anti-rotation spacer which acts to prevent the clamp pin from rotating. The spacer may co-operate with the slot in the fixed portion or moving portion to achieve the anti-rotation feature.

The biasing force may be reacted by the support bracket of the steering assembly, perhaps by the biasing means acting on a further spacer which in turn acts on the support bracket.

The clamp pin may be provided with a shoulder formed at a point along the length of the clamp pin distal from the stopper, the biasing means acting upon the shoulder.

The shoulder may be defined by a transition from a portion of the clamp pin of a first diameter and a second diameter that is larger. The larger diameter portion may be closer to the stopper than the smaller diameter.

In an alternative it may be a transition from a portion of clamp pin of round cross section and a portion of a non-round cross section, especially a square cross section, the non-round section being closer the stopper.

Where a square cross section portion is provided the toothed block may be provided with a hole of corresponding cross section through which the clamp pin is threaded, the non-round cross section preventing rotation of the toothed block relative to the clamp pin.

The stopper may comprise a head formed integral with a shaft of the clamp pin.

At least one secondary biasing means may be located between the spring means and the toothed block which maintains a clearance between the block and spring means when unclamped. The provision of the secondary biasing means helps to move the toothed block along the clamp pin maintaining the clearance between the spring means and the toothed block.

The secondary biasing means should be capable of transferring only a small fraction of the biasing force onto the toothed block. For instance, no more than 20 percent, or 10 percent, or 5 percent of the biasing force may pass through the toothed block and back to the clamp pin.

The secondary biasing means may comprise at least one resilient block, such as rubber block or soft plastic block. The block may be integral with the spacer of the spring means.

The clamp assembly may include two toothed blocks, a first toothed block carrying a first rack of teeth and the second block carrying a second rack of teeth.

The first toothed block may include teeth that engage corresponding teeth located on the support bracket. The second block of teeth may engage corresponding teeth located on the shroud, perhaps on a rail attached to the shroud.

The two toothed blocks may be supported on the clamp pin between the biasing means and the stopper.

Each of the blocks may include an opening through which the clamp pin passes allowing the blocks to move along the clamp pin.

The clamp assembly may include a releasable clamp mechanism which in the clamped condition pulls the clamp pin and hence the stopper in a direction that causes the toothed block to engage the fixed rack. This may therefore provide a clamp force that acts in an opposite direction to the biasing force of the biasing means. It must be a sufficient force to overcome the biasing force.

The clamp mechanism may include a clamp lever, and may include a cam assembly rotatable by the clamp lever.

The fixed portion may comprise a bracket having two spaced arms, the clamp pin passing through an opening in each of the arms. The or each opening may be elongated permitting the clamp pin to be moved along the opening to adjust for rake. The rake rack of teeth, where provided, may extend along the side of the opening.

The moving portion may comprise a part of a steering column shroud, the clamp pin passing through an opening in the shroud. A rail may be secured to the shroud that includes the opening. The or each opening may be elongated permitting movement of the clamp pin along the opening for reach adjustment. The reach rack of teeth where provided by extend along the side of the opening.

Where it is adjustable for reach, the shroud may be telescopic comprising inner and outer portions, the inner portion sliding in the outer portion. The moving portion may comprise the outer portion or it may comprise the inner portion. The inner and outer portions may comprise tubes. The shroud may be fabricated or cast or a mix of fabricated and cast parts.

According to a second aspect the invention provides a steering column assembly including an adjustable steering column shroud and a support bracket and a clamp assembly according to the first aspect.

The steering column assembly may be adjustable for rake or for reach or for both rake and reach.

Other advantages of this invention will become apparent to those skilled in the art from the following detailed description of the preferred embodiments, when read in light of the accompanying drawings.

BRIEF DESCRIPTION OF THE DRAWINGS

FIG. 4 is a view (a) from one side and (b) from the opposite side of a spacer part of the spring means shown in FIG. 3;

FIG. 5 is a view (a) from one side and (b) from the opposite side of an anti-rotation spacer shown in FIG. 4;

FIG. 11 is (a) a perspective view and (b) a view in cross section of the spacer part of the spring means of the third embodiment.

DETAILED DESCRIPTION OF THE INVENTION

Figure 1:
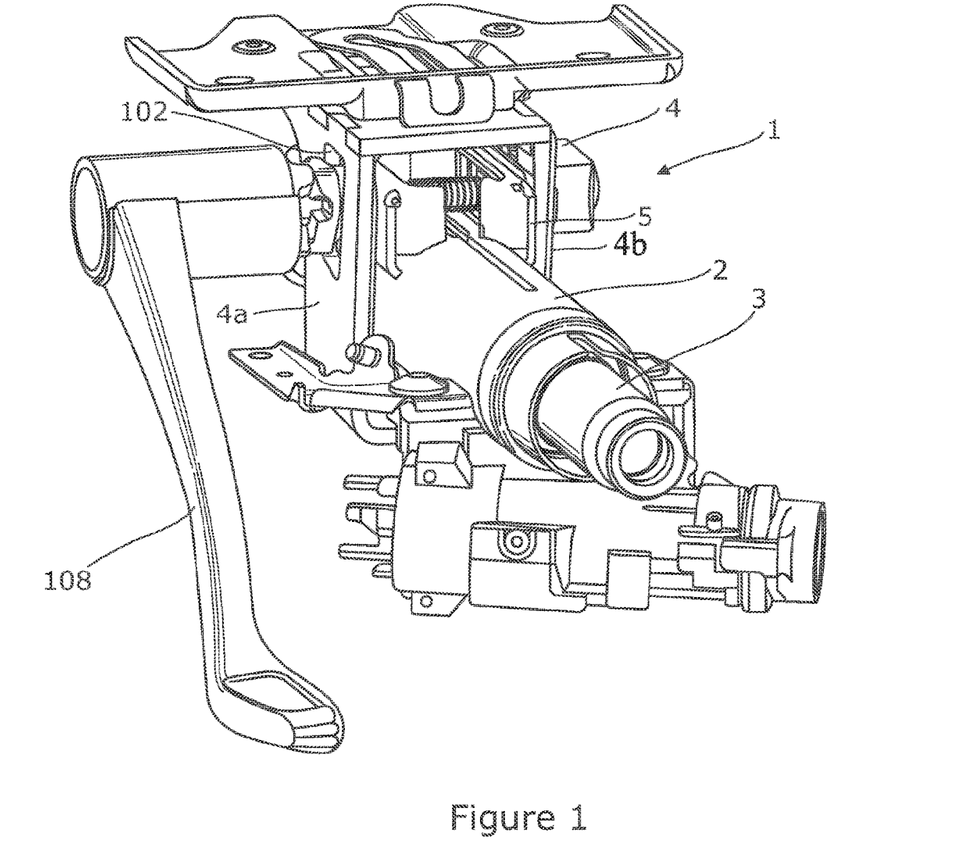
FIG. 1 is a first perspective view of a first embodiment of a steering column assembly which incorporates a clamp assembly according to a first aspect of the invention.

A first embodiment 1 of a steering column assembly for a vehicle which incorporates a clamp assembly according to a first aspect of the invention is shown in FIGS. 2 to 6 of the accompanying drawings. It comprises a steering column shroud having a tubular shroud portion 2 that fits around a collapsible steering shaft 3 as shown in FIG. 1.

The tubular shroud portion 2 may be fixed to a gearbox (not shown) at an end distant from the steering wheel and is able to pivot around a horizontal axis that extends orthogonal to the axis of the steering shaft. The axis is located within the gearbox so that pivoting about this axis allows the shroud to be adjusted for rake. If a gearbox is not provided it may pivot about some other part of the steering assembly. The inner portion, notably, is not able to move along its axis, only to pivot. This steering assembly can therefore only be adjusted for rake, not reach.

The pivoting movement of the shroud 2 is restrained by securing the tubular shroud portion to a support bracket 4 using a clamp assembly as will be described. The clamp assembly is releasable so that the position of the moving portion of the steering column shroud, and hence steering wheel, can be adjusted. When locked the assembly locks the moving portion to the bracket 4 to prevent any relative movement between them although in some cases this could be overcome, for example in the event of an accident.

The support bracket 4 comprises two downwardly extending arms 4a, 4b. The bracket 4 will be referred to herein after as the fixed portion of the steering assembly, being considered fixed in that it is fixed relative to the vehicle body (not shown). The tubular portion 2 of the shroud is reinforced by a box section rail 5 which fits snugly between the two arms 4a, 4b of the bracket 4.

Figure 2:
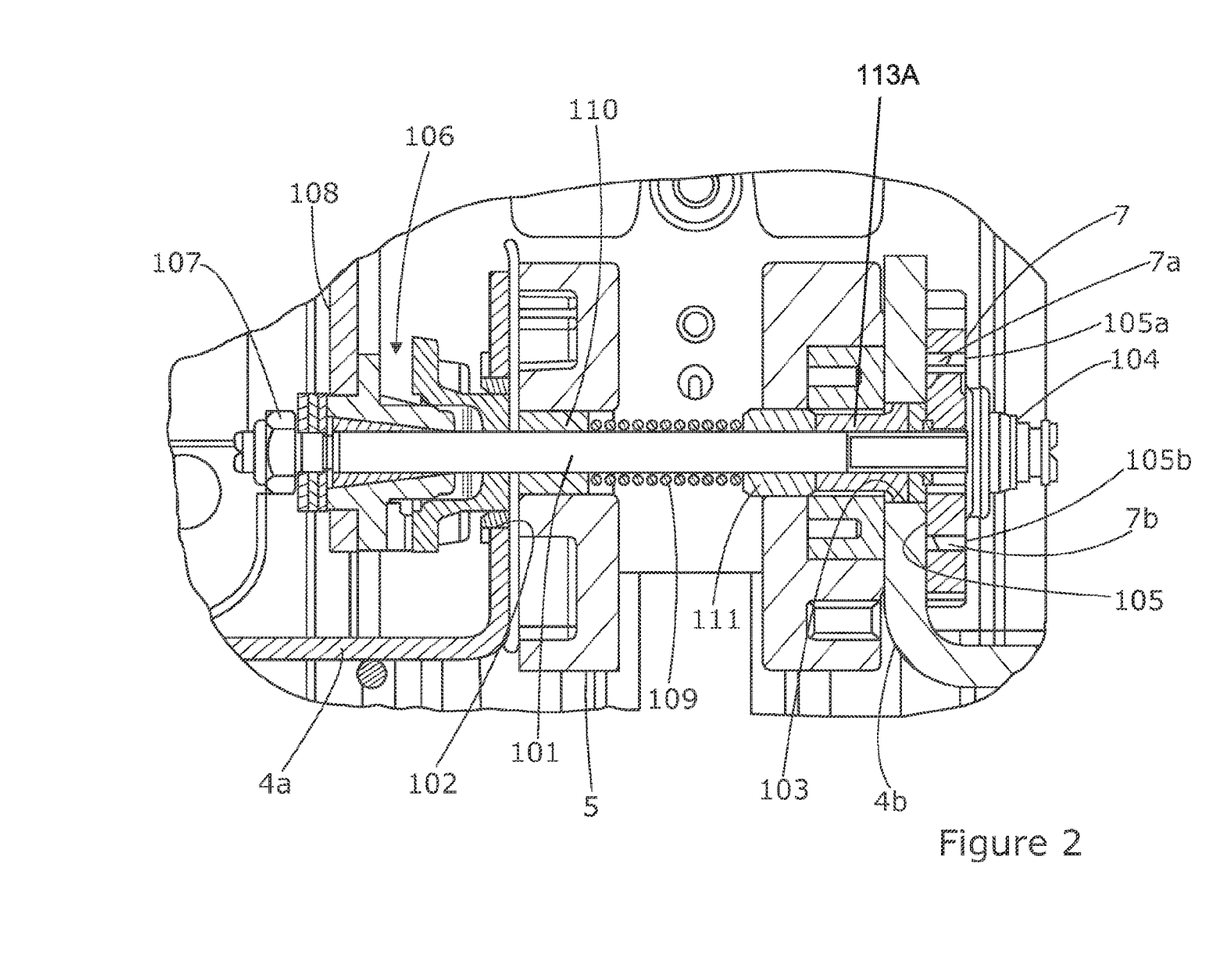
FIG. 2 is a cross section through a portion of the embodiment of FIG. 1.

The clamp assembly of the first embodiment is shown in detail in FIG. 2 of the drawings.

The clamp assembly comprises a clamp pin 101 that extends through an elongate opening 102, 103 in each of the support bracket arms 4a,4b and an opening on opposing sides of the rail 5 on the tubular shroud 2. The slots in the bracket 4 are roughly orthogonal to the axis of the shroud, generally extending along a vertical axis as can be seen in FIG. 1 and the clamp pin can move up and down along those slots to make rake adjustments when the clamp assembly is unlocked.

To positively lock the shroud 2 in place, a toothed rack 7 is provided alongside a slot on an outer face of one arm 4b of the support bracket 4. This is provided by a stamped member 7 which carries two racks of teeth 7a, 7b, each located on a respective side of the slot 103. Of course, it may be possible to make the racks an integral part of the support bracket arm, perhaps by stamping or pressing them into the arm The clamp pin 101 has a stopper 104 at one end and carries a toothed block 105 that is slidingly mounted on the pin so that it can move to and fro across the pin. The block 105 is located between the stopper 104 and the support arm 103 that is provided with the toothed racks. The block 105 carries two racks of teeth 105a, 105b which oppose the racks of teeth 103,104 on the support bracket 102.

The clamp assembly includes a cam/follower mechanism 106 for moving the stopper 104 of the clamp pin 101 towards and away from the support bracket arm 103 during locking and unlocking. This is achieved by a clamp means mounted on the pin 101 at the other end of the clamp pin to the stopper which pulls the stopper towards the support bracket to clamp. When released a biasing means 109,110, 111 pushes the stopper away from the support bracket arm, in turn allowing the toothed block to move away to an unclamped condition.

The cam/follower mechanism is located between a stiff nut 107 at the end of the clamp pin and the arm of the support bracket that does not carry the toothed rack, i.e. on the opposite side of the bracket to the toothed block. The cam/follower mechanism working with the stopper and stiff nut forms a clamp mechanism which can squeeze the bracket arms 4a, 4b together onto the rail 5, and also press the block 105 towards the bracket 4.

The cam mechanism comprises a cam portion that is mounted on the clamp pin 101. Attached to this is an adjustment handle 108 that can be seen in FIGS. 1 and 2. The cam portion is rotatably mounted to the clamp pin 101 so that it can be rotated by moving the handle 108, and carries a ramped cam face which abuts a corresponding ramped cam face provided on a fixed cam portion. The fixed cam portion fits partially within the rake slot of the bracket in such a manner that it cannot rotate but can move to and fro along the shaft. The overall length of the combination of fixed and moving cams on the shaft varies as the handle turns.

The biasing means comprises a coil spring 109 that is wound around the centre of the clamp pin 101. One end acts upon an inner face of the arm 4a of the support bracket 4 nearest the cam mechanism through a reaction member 110. The other end of the spring is terminated at a point along the clamp pin 101 close to the opening in the arm 4b that is closest to the toothed block 105. A shaped spacer 111 is threaded onto the clamp pin 101 and has a first part that passes through the slot 103 in the bracket arm 4b to engage the spring 109 and a second, enlarged part that is located between the arm 4b and the toothed block 105. This is shown in more detail in FIGS. 4(a) and 4(b). The enlarged part acts upon a shoulder 112 formed along the clamp pin. This can be seen most clearly in FIGS. 3 and 6 of the drawings. The shoulder 112 is positioned so that it holds the spacer 111 slightly away from the toothed block 105, creating a small clearance between the toothed block and spacer.

Figure 3:
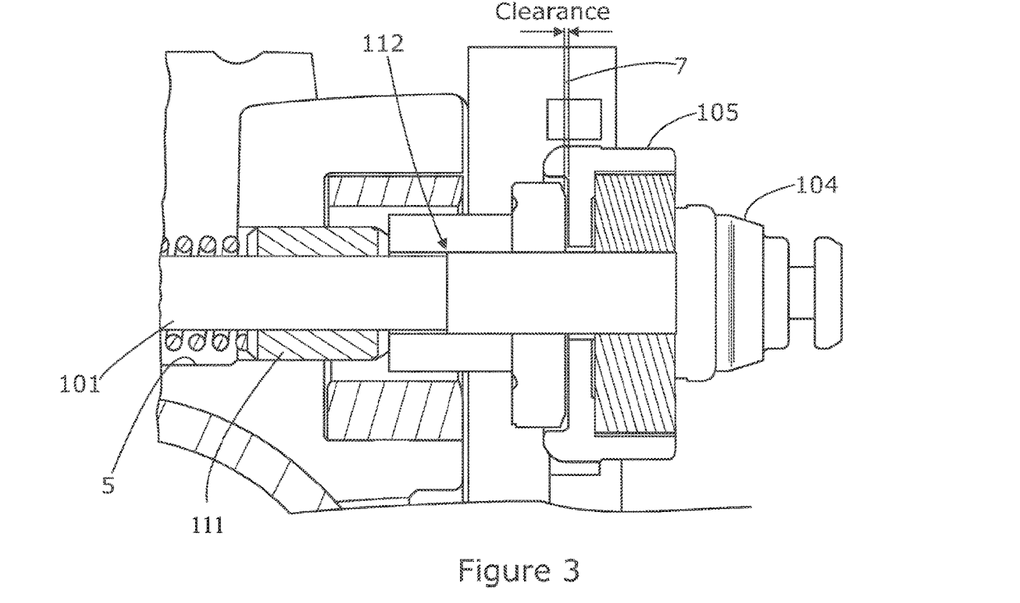
FIG. 3 is an enlarged cross section corresponding to a part of the view of FIG. 2 showing in detail the arrangement of the spring means and toothed block.
Figures 4A, 4B:
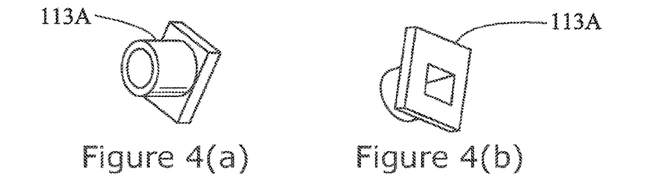
Figures 5A, 5B:
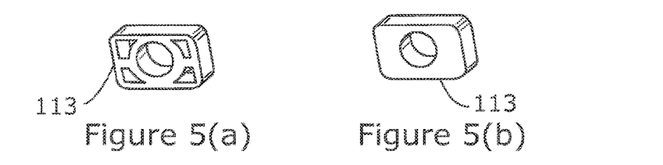
Figure 6:
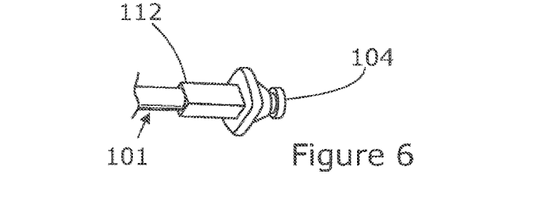
FIG. 6 is a perspective view of a section of the clamp pin of FIG. 2 showing the shoulder present where the clamp pin changes from a square to a round cross section which earths out the spring force.

When the clamp assembly is in the clamped or locked condition, the stopper 104 is pulled towards the support bracket 4b by the cam mechanism. This presses the teeth of the toothed block 105 into engagement with the teeth on the support bracket 4. At the same time, the shoulder 112 on the clamp pin 101 presses against the spacer 111 which compresses the spring 109.

When the cam mechanism is moved to unclamp the clamp assembly, the stopper 104 moves away from the support bracket arm 4b under the biasing force of the spring 109 acting on the spacer 111 which in turn acts on the shoulder 112. The spring force does not act on the toothed block 105 and so does not apply an undesirable load to the toothed block.

Figure 7:
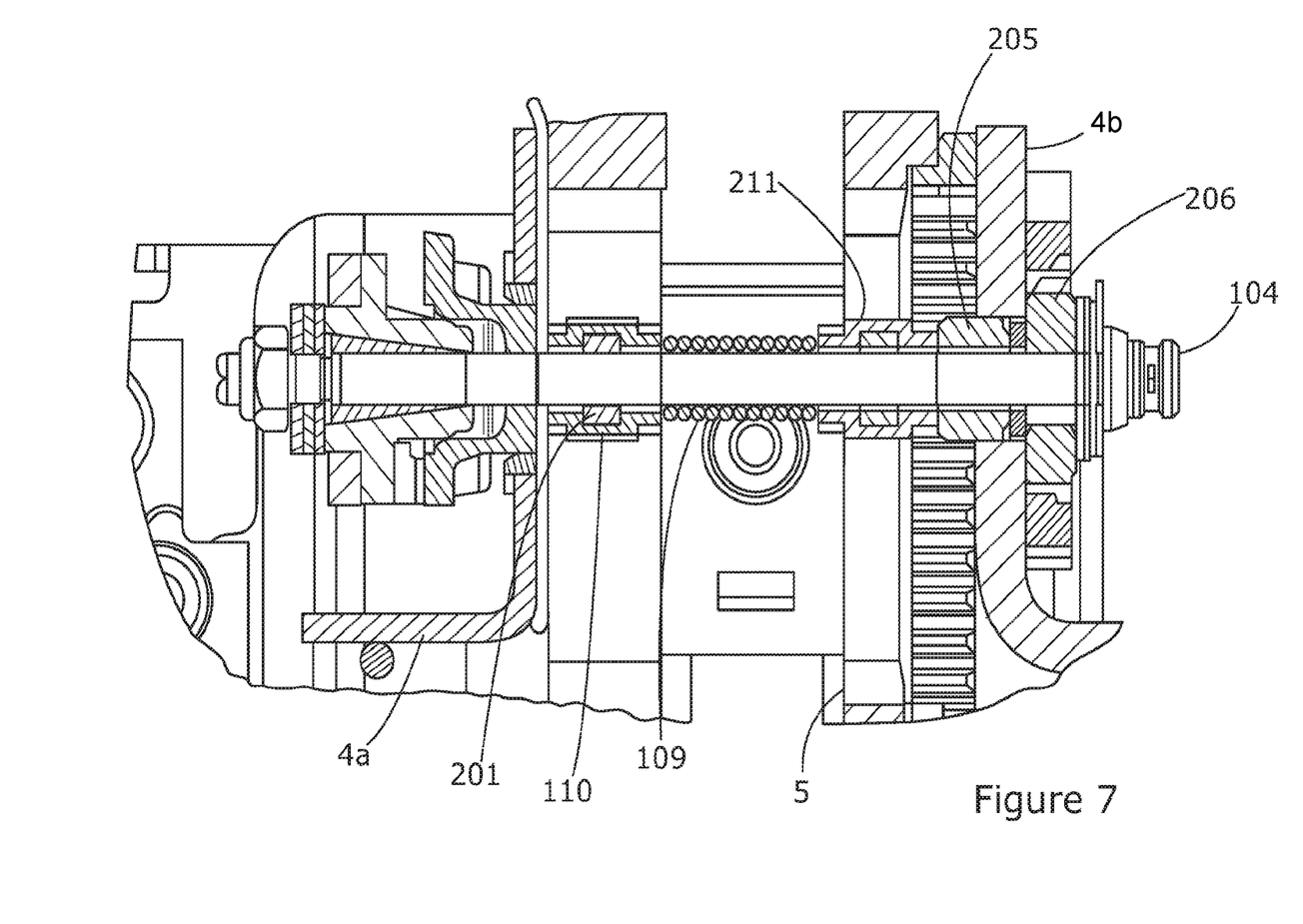
FIG. 7 is a cross section of a second embodiment of steering column assembly showing in detail the arrangement of the spring means and toothed block
Figure 8:
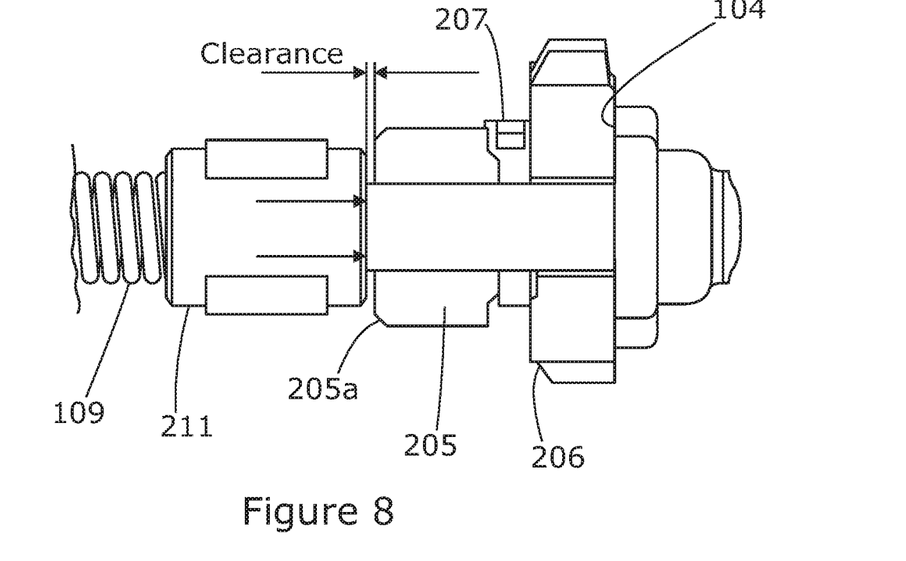
FIG. 8 is an enlarged cross section corresponding to a part of the view of FIG. 7 showing in detail the arrangement of the spring means and toothed block.
Figure 9:
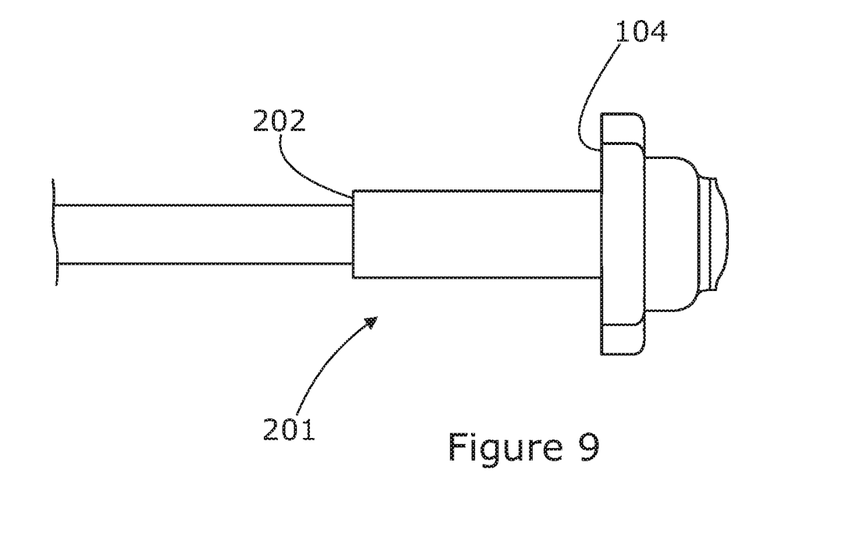
FIG. 9 shows a part of the clamp pin of the second embodiment that differs from the clamp pin of the first embodiment only in the relative location of the shoulder and the stopper.

A second embodiment is shown in FIGS. 7 to 9. The most significant difference between the second embodiment and the first embodiment is that the steering assembly can be adjusted for rake as well as reach. Where appropriate like parts have been marked using the same reference numerals as the first embodiment for clarity.

Reach adjustment is provided by a two part telescopic tubular shroud. The shroud comprises an outer tubular portion 3 that can slide telescopically over an inner tubular shroud portion. The outer portion 3 can slide up and down the inner portion to enable the length of the shroud to be adjusted. This permits the reach of the steering to be adjusted. The movable outer portion carries the rail 5 of the first embodiment.

Similar to the first embodiment, the inner portion is fixed to a gearbox or other fixed part and is able to pivot around a horizontal axis that extends orthogonal to the axis of the steering shaft. The axis is located within the gearbox so that pivoting about this axis allows the shroud to be adjusted for rake. The inner portion, notably, is not able to move along it axis, only to pivot.

The pivoting and telescoping movement of the shroud 3 is restrained by securing the moving portion (the outer tubular portion) to the support bracket 4 using a clamp assembly similar to that of the first embodiment. Rake adjustment is accommodated by passing a clamp pin 201 through a pair of elongate slots in the support arm bracket 4. Reach adjustment is accommodated by making the opening in the rail 5 through which the clamp pin passes elongated slots, the axis of the slots running parallel to the axis of the shroud. The clamp pin can therefore move along these slots when unclamped.

The clamp assembly is releasable so that the position of the moving portion of the steering column shroud, and hence steering wheel, can be adjusted independently for reach and rake. When locked the assembly locks the moving portion to the bracket to prevent any relative movement between them although in some cases this could be overcome, for example in the event of an accident.

Where the first embodiment included a single toothed block that had teeth that cooperate with teeth on the support bracket to provide positive locking of the rake position, this embodiment includes two toothed blocks 205, 206. The blocks 205, 206 are threaded onto the end of the clamp pin between the stopper and the arm of the support bracket that carries the rake adjustment teeth. These can best be seen in FIG. 8 of the drawings.

A second toothed block 205 carries a rack of teeth 205a and is shaped so that it passes through the elongate slot in the support bracket arm 4b. This rack carries teeth which in the clamped condition of the clamp assembly engage teeth provided alongside the slot in the rail and so controls the reach of the steering assembly.

A first toothed block 206 also carries a rack of teeth 206a and is shaped so that it engages a corresponding rack of teeth that are carried by arm 4b of the support bracket. This block 206 therefore function in a similar way to the block 105 of the first embodiment. At least a part of this block 206 must therefore pass through the slot in the support bracket arm. The block 206 is located nearer the stopper than the block 205.

As with the first embodiment, a cam mechanism is provided and a biasing means 109, 110, and 211 that biases the clamp pin 201 in a direction that releases the toothed blocks when unclamped. This biasing means comprises a coil spring 109 wrapped around the clamp pin and a spacer 211. The spacer 211 acts on a shoulder 202 formed in the pin that ensures that the biasing force (shown by the arrows in FIG. 8) is applied to the pin 201 but not the toothed blocks. The clamp pin 201 is generally the same as the first embodiment and is shown in more detail in FIG. 9.

Also present is a spacer block 113 that is located on an inner face of the arm 4b. This has an opening through which the clamp pin and the smaller end of the spacer 112 is passed. It is shown in detail in FIGS. 5(a) and 5(b).

Figure 10:
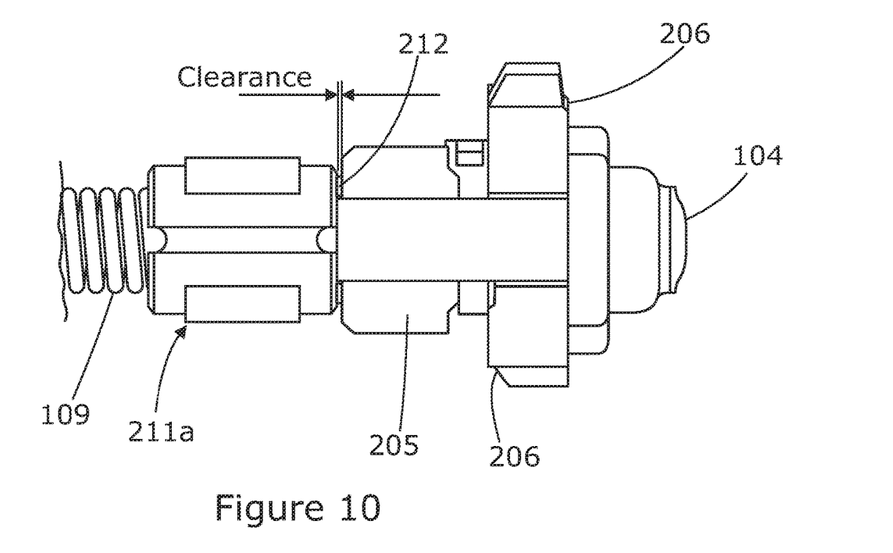
FIG. 10 is a cross section of a modification of the second embodiment of steering column assembly which provides third embodiment of the present invention showing in detail the arrangement of the spring means and toothed block and additional resilient spacers between the spring means and the toothed racks.
Figure 11A:
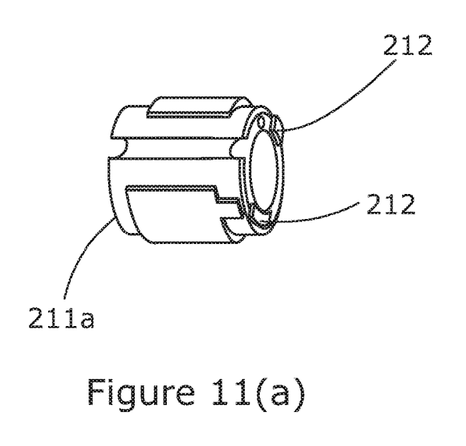
Figure 11B:
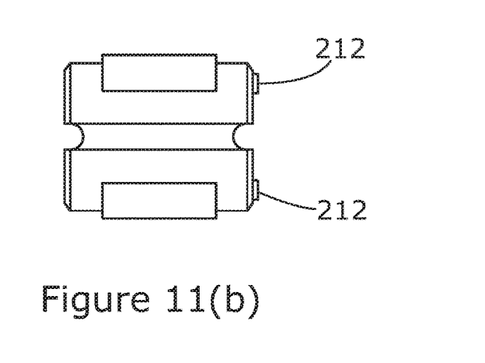

A third embodiment is illustrated in FIGS. 10 and 11 of the drawings. This is very similar to the second embodiment, allowing reach and rake adjustment. Where parts are the same in the third embodiment as they are in the second embodiment the same reference numerals have been used for clarity.

The third embodiment differs from the second only by the provision of a modified spacer 211a that replaces spacer 211. The spacer 211a of the spring means includes two resilient elements or pads 212 that fit in the clearance between the main body of the spacer 211a and the toothed block 205. These pads do not transfer any spring force to the toothed block but control the movement of the blocks relative to the spacer preventing rattle due to the clearance. In the unclamped condition the elements bias the toothed blocks towards the stopper independent of the biasing force applied by the biasing means.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A clamp assembly for securing a fixed portion of a support bracket of a vehicle to a movable portion of a steering column shroud of a steering column assembly, the clamp assembly comprising:

a clamp pin which passes through an opening in the fixed portion of the support bracket and an opening in the moveable portion, a stopper located towards one end of the clamp pin, a toothed block carried by the clamp pin having a set of rake teeth, the rake teeth being urged by the stopper into engagement with a set of teeth fixed to the support bracket when the clamp assembly is in a clamped condition, thereby securing relative positions of the fixed portion of the support bracket and the moveable portion of the steering column assembly;

and a biasing means that provides a biasing force that acts in an unclamped condition of the clamp assembly to bias the stopper of the clamp pin away from the moveable portion to permit the set of rake teeth on the toothed block to move clear of the set of teeth of the fixed portion of the support bracket, thereby permitting relative movement of the fixed portion of the support bracket and the moveable portion of the steering column assembly; wherein the biasing force provided by the biasing means acts upon the clamp pin without passing through the toothed block; and further comprising at least one secondary biasing means located between the biasing means and the toothed block which maintains a clearance between the toothed block and the biasing means when in the unclamped condition.

2. The clamp assembly according to claim 1 in which the clearance permits free movement of the toothed block orthogonal to an axis of the clamp pin that is not impeded by the biasing force provided by the biasing means.

3. The clamp assembly according to claim 1 in which the biasing means comprises a spring and a spacer, the spring applying a biasing force to the spacer which in turn acts directly on a part of the clamp pin.

4. The clamp assembly according to claim 1 in which the biasing force is reacted to by the support bracket of the steering assembly.

5. The clamp assembly according to claim 1 in which the stopper comprises a head formed integral with a shaft of the clamp pin.

6. The clamp assembly according to claim 1 that additionally includes a second toothed block carried by the clamp pin having a set of reach teeth, the teeth of the second toothed block being urged into engagement with a rack of teeth fixed to the moving portion by the stopper when the clamp assembly is in the clamped condition, thereby securing the relative positions of the fixed and moving portions of the steering assembly.

7. The clamp assembly according to claim 1 that further includes a releasable clamp mechanism which in the clamped condition pulls the clamp pin and the stopper in a direction that causes the toothed block to engage the respective fixed rack.

8. The clamp assembly according to claim 1 in which the support bracket comprises a bracket having two spaced arms, the clamp pin passing through an opening in each of the arms and the moveable portion comprises a shroud, the clamp pin passing through an opening in the shroud.

9. A steering column assembly including an adjustable steering column shroud and a support bracket and a clamp assembly according to claim 1.

10. The clamp assembly according to claim 1 in which the clamp pin is provided with a shoulder formed at a point along a length of the clamp pin distal from the stopper, the biasing means acting upon the shoulder.

11. The clamp assembly according to claim 10 which the shoulder is defined by a transition from a portion of clamp pin of round cross section to a portion of a non-round cross section, the non-round section being closer to the stopper, the portion of non-round cross section preventing rotation of the toothed block relative to the clamp pin.

12. The clamp assembly according to claim 1 in which the secondary biasing means comprises at least one resilient block.

13. The clamp assembly according to claim 12 in which the at least one resilient block is a rubber block or a soft plastic block.

* * * * *